United States Patent
Gauthier

(10) Patent No.: US 9,200,697 B1
(45) Date of Patent: Dec. 1, 2015

(54) DUAL RATIO CONSTANT MESH GEARBOX

(71) Applicant: Atieva, Inc., Redwood City, CA (US)

(72) Inventor: Jean-Philippe Gauthier, San Francisco, CA (US)

(73) Assignee: ATIEVA, INC., Menlo Park, CA (US)

( * ) Notice: Subject to any disclaimer, the term of this patent is extended or adjusted under 35 U.S.C. 154(b) by 79 days.

(21) Appl. No.: 14/273,934

(22) Filed: May 9, 2014

Related U.S. Application Data

(63) Continuation-in-part of application No. 14/273,822, filed on May 9, 2014, which is a continuation-in-part of application No. 14/273,667, filed on May 9, 2014, now Pat. No. 9,109,666.

(51) Int. Cl.
| | |
|---|---|
| F16H 3/54 | (2006.01) |
| F16H 61/02 | (2006.01) |
| F16H 61/686 | (2006.01) |
| F16H 57/10 | (2006.01) |
| F16H 57/08 | (2006.01) |

(52) U.S. Cl.
CPC .................. *F16H 3/54* (2013.01); *F16H 57/10* (2013.01); *F16H 61/0213* (2013.01); *F16H 61/686* (2013.01); *F16H 2057/087* (2013.01); *F16H 2061/0232* (2013.01); *F16H 2200/0021* (2013.01); *F16H 2200/0034* (2013.01); *F16H 2200/2005* (2013.01); *F16H 2200/2035* (2013.01); *F16H 2200/2082* (2013.01)

(58) Field of Classification Search
CPC ................ F16H 2200/2005; F16H 2200/2082; F16H 2200/0021; F16H 2200/0034
USPC .......................................... 475/318, 320, 322
See application file for complete search history.

(56) References Cited

U.S. PATENT DOCUMENTS

| | | | | |
|---|---|---|---|---|
| 680,825 | A | * | 8/1901 | Westinghouse ........... F16H 3/54 475/140 |
| 1,041,047 | A | | 10/1912 | Drake et al. |
| 2,007,304 | A | | 7/1935 | Padgett |
| 2,655,820 | A | * | 10/1953 | Baines ..................... F16H 57/10 475/155 |
| 3,541,886 | A | * | 11/1970 | Bookout ................... F16H 3/66 475/285 |
| 3,898,893 | A | * | 8/1975 | Hashimoto .......... B60K 41/062 477/109 |
| 4,800,782 | A | | 1/1989 | Sivalingam |
| 5,151,068 | A | * | 9/1992 | Mann ........................ F16H 3/54 192/48.619 |
| 6,719,109 | B1 | * | 4/2004 | Li .............................. F16H 3/66 192/3.52 |
| 7,344,471 | B2 | * | 3/2008 | Sugino .................... F16H 37/04 475/318 |
| 7,367,910 | B2 | * | 5/2008 | Schmidt ................. B60K 6/365 475/317 |
| 8,303,459 | B2 | * | 11/2012 | Kawai ................... F16H 37/027 475/210 |
| 8,460,152 | B2 | * | 6/2013 | Parsons ................... F16D 41/07 475/283 |
| 8,469,855 | B2 | | 6/2013 | Phillips |
| 8,506,445 | B2 | * | 8/2013 | Wittkopp ................ F16D 7/028 192/55.1 |
| 9,062,744 | B2 | * | 6/2015 | Valente ..................... F16H 3/54 |
| 2004/0242369 | A1 | | 12/2004 | Alfredsson |
| 2006/0025278 | A1 | * | 2/2006 | Antonov ............. F16D 25/0638 475/318 |
| 2014/0274528 | A1 | | 9/2014 | Valente et al. |
| 2015/0158382 | A1 | | 6/2015 | Mordukhovich et al. |

* cited by examiner

*Primary Examiner* — Sherry Estremsky
(74) *Attorney, Agent, or Firm* — Patent Law Office of David G. Beck

(57) ABSTRACT

A dual ratio constant mesh gearbox is provided that is suitable for use with an automobile, and particularly well-suited for an electric vehicle. The gearbox, which may be configured either as a manual or automatic gearbox, utilizes a planetary gear set and a pair of clutches to shift between under drive and direct drive modes.

21 Claims, 8 Drawing Sheets

DUAL RATIO CONSTANT MESH GEARBOX

CROSS-REFERENCE TO RELATED APPLICATION

This application is a continuation-in-part of U.S. patent application Ser. No. 14/273,822, filed 9 May 2014, which is a continuation-in-part of U.S. patent application Ser. No. 14/273,667, filed 9 May 2014, the disclosures of which are incorporated herein by reference for any and all purposes.

FIELD OF THE INVENTION

The present invention relates generally to a vehicle and, more particularly, to a dual speed gearbox suitable for use with an electric motor.

BACKGROUND OF THE INVENTION

In a typical electric vehicle a single speed gearbox is used between the traction motor and the differential. The ability to use a single speed gearbox rather than the multi-speed gearbox required in a conventional vehicle is the result of the wide useful operating range, both in terms of power and torque, of an electric motor versus that of an internal combustion engine.

While a single speed gearbox may be used with an electric vehicle, its use is not without drawbacks. For example, because of the maximum speed limit of the motor and the requirement in a high performance car to reach a certain top speed, the gear ratio is typically chosen to be longer than what would be optimal to provide crisp initial acceleration from a standstill. Additionally, due to torque ripple and vibrations, motor torque may be limited at very low rotating speeds. As a result, initial acceleration from a standstill in a typical electric vehicle is typically more sluggish than what would be expected given the drivetrain's characteristics.

Accordingly, what is needed is a dual speed gearbox that may be optimized for the operating characteristics of an electric motor, thereby providing the desired level of performance throughout the vehicle's operating range. The present invention provides such a dual speed gearbox.

SUMMARY OF THE INVENTION

The present invention provides a dual ratio constant mesh gearbox suitable for use with an automobile, and in particular suited for an electric vehicle. The gearbox is comprised of (i) a housing, (ii) an input drive shaft coupled to the vehicle's propulsion electric motor, (iii) an externally toothed sun gear rigidly coupled to the input drive shaft, (iv) an internally toothed ring gear, (v) a set of planetary gears interposed between the sun and ring gears, where the set of planetary gears are in constant mesh with both the sun and ring gears, (vi) a planetary gear carrier coupled to the set of planetary gears and to an output drive shaft, where the output drive shaft is at least partially contained within the housing, (vii) a sprag clutch assembly contained within the housing, where the sprag clutch permits rotation of the ring gear in a first direction while preventing rotation of the ring gear in a second direction, (viii) a second clutch assembly separate and independent of the sprag clutch assembly, where engaging the second clutch assembly locks the ring gear to the sun gear, and disengaging the second clutch assembly unlocks the ring gear from the sun gear, and (ix) a band brake translatable from at least a first position to a second position, where the band brake in the first position permits rotation of the ring gear within the housing, and where the band brake in the second position prevents rotation of the ring gear within the housing. The gearbox may use a hollow output drive shaft and be configured to pass the input drive shaft through the hollow output drive shaft, where the input and output drive shafts are coaxial. The second clutch assembly is preferably comprised of a multi-plate clutch assembly. The second clutch assembly may include a pressure plate actuator where the position of the pressure plate actuator determines whether the second clutch assembly is engaged or disengaged; further, a positioning motor may be coupled to the pressure plate actuator, where the positioning motor controls the position of the pressure plate actuator.

In one aspect, the gearbox operates in a direct drive mode when the second clutch assembly is engaged and the ring gear is locked to the sun gear, resulting in the sun gear, the ring gear and the set of planetary gears rotating within the housing as a single unit and causing the input drive shaft to be directly coupled to the output drive shaft and for the two drive shafts to rotate at the same rate.

In another aspect, the gearbox operates in an under drive reverse mode when the second clutch assembly is disengaged and the band brake is in the second position. As a result, when reverse input torque is applied to the input drive shaft a reaction torque is generated on the ring gear in the first direction. While rotation of the ring gear in the first direction is permitted by the sprag clutch assembly, ring gear rotation is prevented by the band brake being in the second position, thereby causing reverse vehicle torque to be applied to the vehicle's wheel(s) when reverse input torque is applied to the input drive shaft.

In another aspect, the gearbox operates in an under drive mode when the second clutch assembly is disengaged and the ring gear is unlocked from the sun gear. In this mode, forward input torque applied to the input drive shaft generates a reaction torque on the ring gear in the second direction, where rotation of the ring gear in the second direction is prevented by the sprag clutch assembly. As a result, forward input torque applied to the input drive shaft causes forward vehicle torque to be applied to the vehicle's wheel(s) via the planetary gear carrier and the output drive shaft.

In another aspect, a controller coupled to the vehicle's propulsion motor is also coupled to a motor speed sensor and an output drive shaft speed sensor. When a downshift from the direct drive mode to the under drive mode is initiated, the controller is configured to increase the motor's speed based on the current output drive shaft speed and the under drive gear ratio.

In another aspect, a controller coupled to the vehicle's propulsion motor is also coupled to a motor speed sensor and an output drive shaft speed sensor. When an upshift from the under drive mode to the direct drive mode is initiated, the controller is configured to decrease the motor's speed based on the current output drive shaft speed and the under drive gear ratio.

In another aspect, the gearbox may further comprise (i) a pressure plate actuator where the position of the pressure plate actuator determines whether the second clutch assembly is engaged or disengaged, (ii) a positioning motor coupled to the pressure plate actuator that controls the position of the pressure plate actuator, (iii) a controller coupled to the vehicle's propulsion motor and to the positioning motor, and (iv) a motor speed sensor coupled to the controller, where the controller is configured to automatically upshift from the under drive mode to the direct drive mode and to automatically downshift from the direct drive mode to the under drive mode based on current motor speed and a set of preprogrammed shift instructions, where the gearbox operates in the under drive mode when the second clutch assembly is disengaged and the ring gear is unlocked from the sun gear, and where the gearbox operates in the direct drive mode when the second clutch assembly is engaged and the ring gear is locked to the sun gear. The gearbox may include a drive mode selector switch for selecting among a plurality of selectable drive modes, where each selectable drive mode corresponds to one of a plurality of shift instruction subsets, and where the set of preprogrammed shift instructions is comprised of the plurality of shift instruction subsets. The gearbox may include a drive mode over-ride switch, where activation of the drive mode over-ride switch alters the set of preprogrammed shift instructions, for example forcing the gearbox to remain within the direct drive mode. The gearbox may further include (i) a second positioning motor coupled to the band brake and to the controller, where the second positioning motor controls whether the band brake is in the first or second position, and (ii) a reverse mode selector switch configured to be user selectable, where the controller is configure to shift into a reverse drive mode when the reverse mode selector switch is selected, and where the gearbox operates in the reverse drive mode when the second clutch assembly is disengaged and the band brake is in the second position.

In another aspect, the gearbox may further comprise (i) a pressure plate actuator where the position of the pressure plate actuator determines whether the second clutch assembly is engaged or disengaged, (ii) a positioning motor coupled to the pressure plate actuator that controls the position of the pressure plate actuator, (iii) a controller coupled to the vehicle's propulsion motor and to the positioning motor, and (iv) an output drive shaft speed sensor coupled to the controller, where the controller is configured to automatically upshift from the under drive mode to the direct drive mode and to automatically downshift from the direct drive mode to the under drive mode based on current output drive shaft speed and a set of preprogrammed shift instructions, where the gearbox operates in the under drive mode when the second clutch assembly is disengaged and the ring gear is unlocked from the sun gear, and where the gearbox operates in the direct drive mode when the second clutch assembly is engaged and the ring gear is locked to the sun gear. The gearbox may include a drive mode selector switch for selecting among a plurality of selectable drive modes, where each selectable drive mode corresponds to one of a plurality of shift instruction subsets, and where the set of preprogrammed shift instructions is comprised of the plurality of shift instruction subsets. The gearbox may include a drive mode over-ride switch, where activation of the drive mode over-ride switch alters the set of preprogrammed shift instructions, for example forcing the gearbox to remain within the direct drive mode. The gearbox may further include (i) a second positioning motor coupled to the band brake and to the controller, where the second positioning motor controls whether the band brake is in the first or second position, and (ii) a reverse mode selector switch configured to be user selectable, where the controller is configure to shift into a reverse drive mode when the reverse mode selector switch is selected, and where the gearbox operates in the reverse drive mode when the second clutch assembly is disengaged and the band brake is in the second position.

In another aspect, the gearbox may further comprise (i) a pressure plate actuator where the position of the pressure plate actuator determines whether the second clutch assembly is engaged or disengaged, (ii) a positioning motor coupled to the pressure plate actuator that controls the position of the pressure plate actuator, (iii) a controller coupled to the vehicle's propulsion motor and to the positioning motor, (iv) a user selectable under drive mode selector switch which, when selected, causes the controller to shift into the under drive mode, and (v) a user selectable direct drive mode selector switch which, when selected, causes the controller to shift into the direct drive mode. The gearbox operates in the under drive mode when the second clutch assembly is disengaged and the ring gear is unlocked from the sun gear, and the gearbox operates in the direct drive mode when the second clutch assembly is engaged and the ring gear is locked to the sun gear. The gearbox may further include (i) a second positioning motor coupled to the band brake and to the controller, where the second positioning motor controls whether the band brake is in the first or second position, and (ii) a reverse mode selector switch configured to be user selectable, where the controller is configure to shift into a reverse drive mode when the reverse mode selector switch is selected, and where the gearbox operates in the reverse drive mode when the second clutch assembly is disengaged and the band brake is in the second position.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
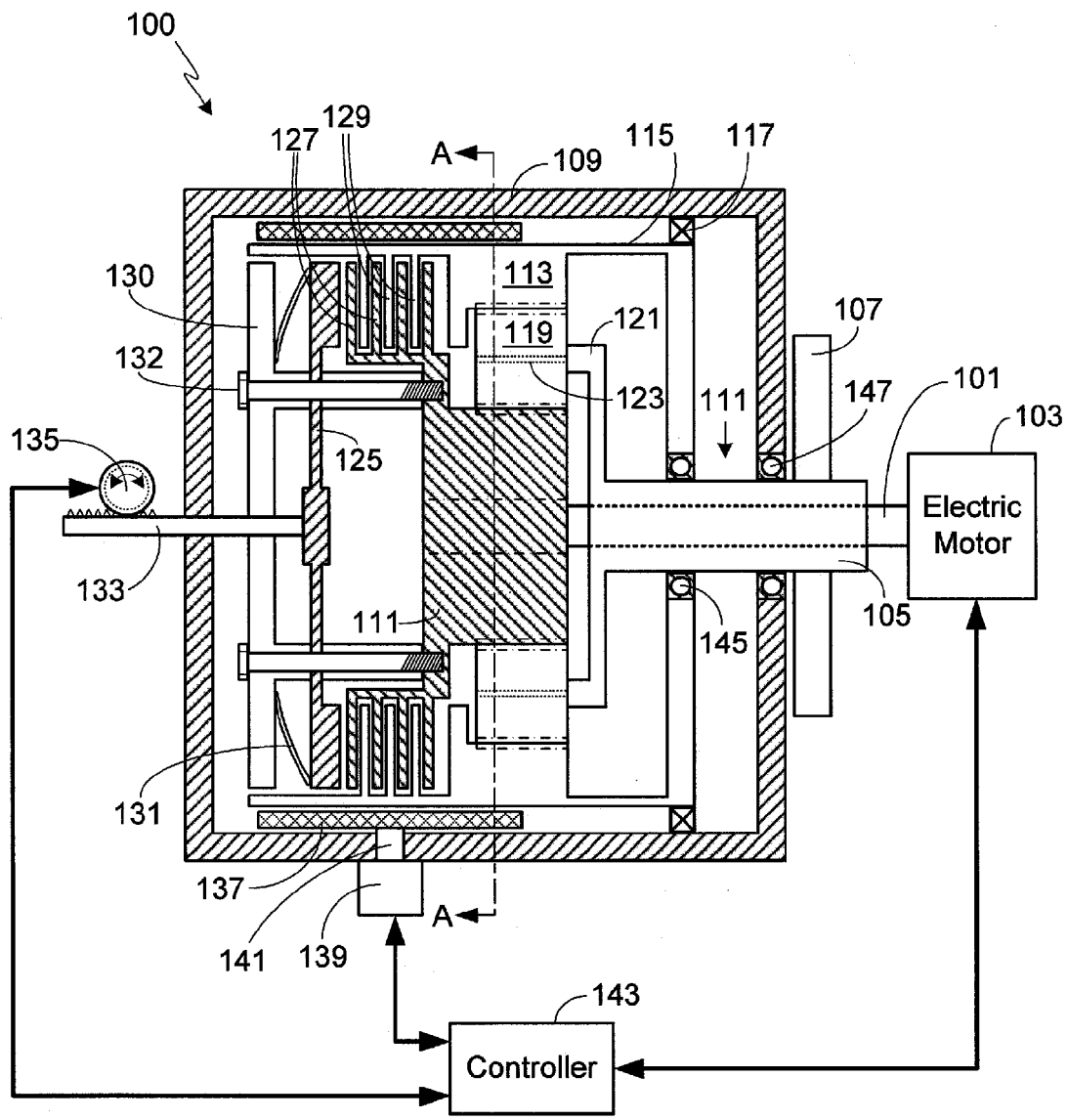
FIG. 1 provides a cross-sectional view of a dual ratio gearbox in accordance with the invention.

The gearbox described and illustrated herein is generally designed for use with devices requiring a two-speed transmission, and more specifically, for a vehicle using an electric motor, e.g., an electric vehicle (EV). As shown in FIG. 1, input drive shaft 101 of gearbox 100 is coupled to the vehicle's electric motor 103 while output shaft 105 is coupled to one or more wheels of the vehicle. Although output shaft 105 may be coupled directly to the vehicle's wheels, preferably it is coupled via a differential, not shown, to the wheels. In FIG. 1, output shaft 105 is shown coupled to an output gear 107. Note that output shaft 105 may also be coupled to an output gear located within gearbox housing 109, for example at a location 111.

Input drive shaft 101, which passes into gearbox housing 109 through hollow output shaft 105, is rigidly coupled to a sun gear 111. Although sun gear 111 and input drive shaft 101 may be fabricated as a single component, i.e., from a single piece of stock, preferably and as illustrated a spline gear coupling is used to rigidly couple input drive shaft 101 to sun gear 111. A ring gear 113 is coupled to a ring gear carrier 115. Preferably ring gear 113 and ring gear carrier 115 are fabricated as a single component, i.e., from a single piece of stock. A clutch assembly comprised of a sprag clutch 117 allows ring gear 113 to only rotate in a single direction within housing 109. As described in detail below, sprag clutch assembly 117 allows the forward driving torque output of gearbox 100 to be adjusted regardless of whether the gearbox is operating in the indirect or direct drive mode, while only allowing reverse driving torque output when the gearbox is in the indirect drive mode.

Interposed between ring gear 113 and sun gear 111, and in constant mesh with ring gear 113 and sun gear 111, are planetary gears 119. A planetary gear carrier 121 is coupled to each of the planetary gears 119 via bearings 201 and pins 123.

Gearbox 100 also includes a second clutch assembly, separate and independent of sprag clutch assembly 117. The clutch assembly, which is preferably a multi-plate clutch, includes pressure plate 125, discs 127 that are coupled to sun gear 111, plates 129 that are coupled to ring gear 113 and ring gear carrier 115, and compression spring 131. A spring mounting plate 130 is coupled to sun gear 111 using a plurality of bolts 132. Although a variety of techniques, including a hydraulic control system, may be used to operate the second clutch assembly, preferably pressure plate actuator 133 is controlled using an electric positioning motor 135 as shown.

Gearbox 100 also includes a band brake that is used to prevent rotation of ring gear 113 in the direction of rotation allowed by sprag clutch assembly 117. The band brake includes brake band 137 which surrounds ring gear 113 and its assembly. An actuator 139, preferably an electric motor, is coupled to brake band 137 via brake band coupling member 141. Preferably operation of brake band actuator 139 is controlled by controller 143. In the preferred embodiment, motor controller 143 is also coupled to, and controls, vehicle drive motor 103 and clutch controller 135. In FIG. 1, shaft bearings 145 and 147 are also shown.

Figure 2:
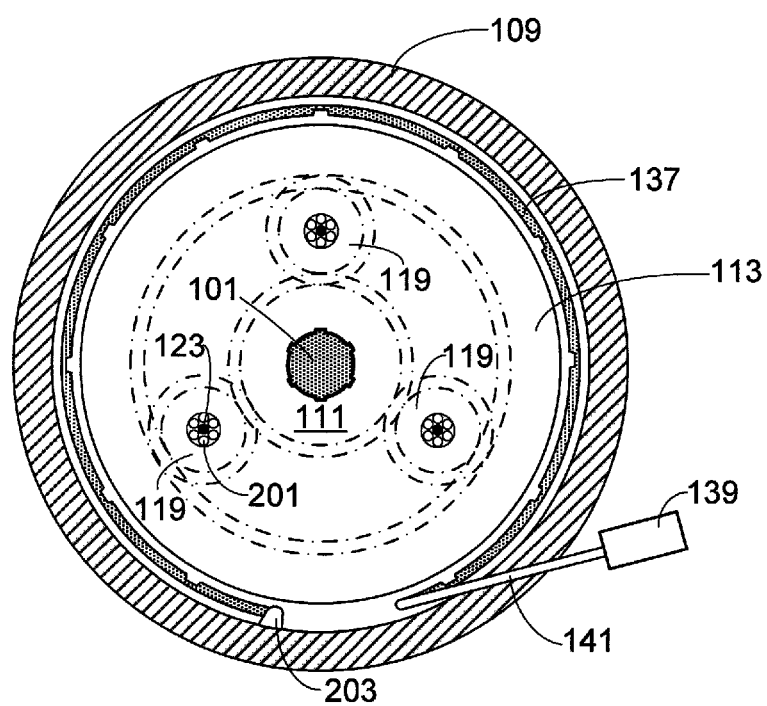
FIG. 2 provides a cross-sectional view of the gear assembly taken along plane A-A of FIG. 1.

A cross-sectional view of the gear assembly, taken along plane A-A, is shown in FIG. 2. Note that for clarity the individual gear teeth of sun gear 111, planetary gears 119 and ring gear 113 are not shown, nor are the splines/grooves used to couple input drive shaft 101 to sun gear 111. This view of the planetary gear system also shows brake band 137, along with band brake anchor 203, actuator 139, and brake band coupling member 141.

Under Drive Mode—Forward Vehicle Travel

In order to achieve forward vehicle motion with the gearbox in under drive, controller 144 uses motor 135 to position actuator 133 and pressure plate 125 such that the clutch assembly is disengaged as shown in FIG. 1. As a result, sun gear 111 is allowed to rotate independently of ring gear 113. On forward torque transmission, the input torque applied by motor 103 to input drive shaft 101, and thus to sun gear 111, generates a reaction torque on ring gear 113 in the direction that is locked by sprag clutch assembly 117. As a result, forward torque is transmitted to the wheels of the vehicle by planetary gear carrier 121 and output drive shaft 105.

Under Drive Mode—Reverse Vehicle Travel

Figure 3:
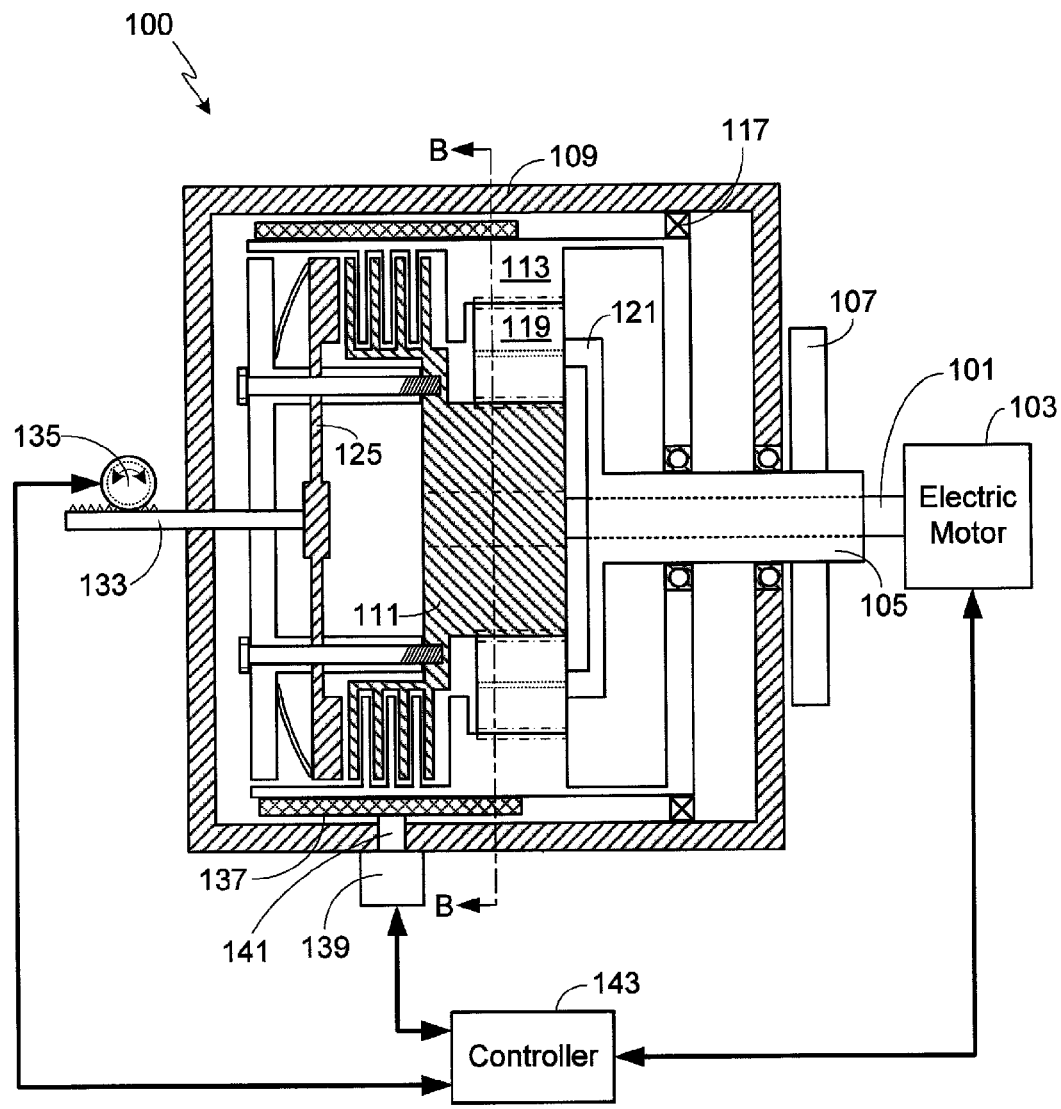
FIG. 3 provides a view of the dual ratio gearbox of FIGS. 1 and 2, configured to provide under drive, reverse torque to the wheels of the vehicle.
Figure 4:
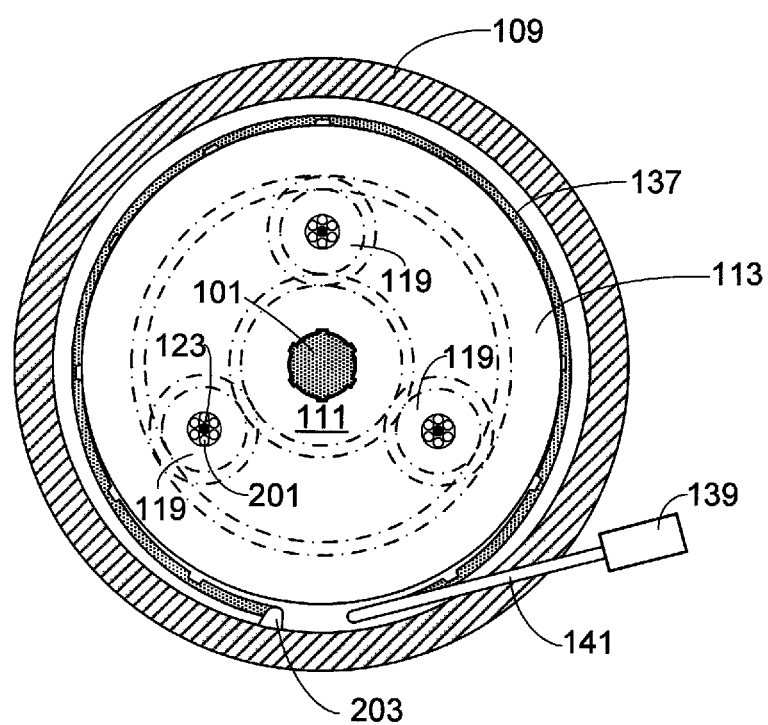
FIG. 4 provides a cross-sectional view of the gear assembly taken along plane B-B of FIG. 3.

When the input torque applied by motor 103 to input drive shaft 101 and sun gear 111 is reversed, sprag clutch assembly 117 no longer locks the ring gear to housing 109. Accordingly in order to achieve reverse vehicle travel, controller 143 engages band brake 137 using actuator 139 while keeping the clutch assembly disengaged using motor 135, actuator 133 and pressure plate 125. Engaging band brake 143 locks ring gear 133 to housing 109. Then when reverse torque is applied by drive motor 103 to input drive shaft 101, ring gear 113 is locked into position relative to housing 109 and reverse torque is transmitted to the wheels of the vehicle by planetary gear carrier 121 and output drive shaft 105. Therefore in reverse, rather than using sprag clutch assembly 117 to lockup ring gear 113, band brake 137 locks the ring gear into place. As a result of this configuration, both forward and reverse torque can be applied to the vehicle's wheels when gearbox 100 is operating in the under drive mode. FIGS. 3 and 4 provide similar views of gearbox 100 as shown in FIGS. 1 and 2 with band brake 137 engaged.

Direct Drive Mode—Forward Vehicle Travel

Figure 5:
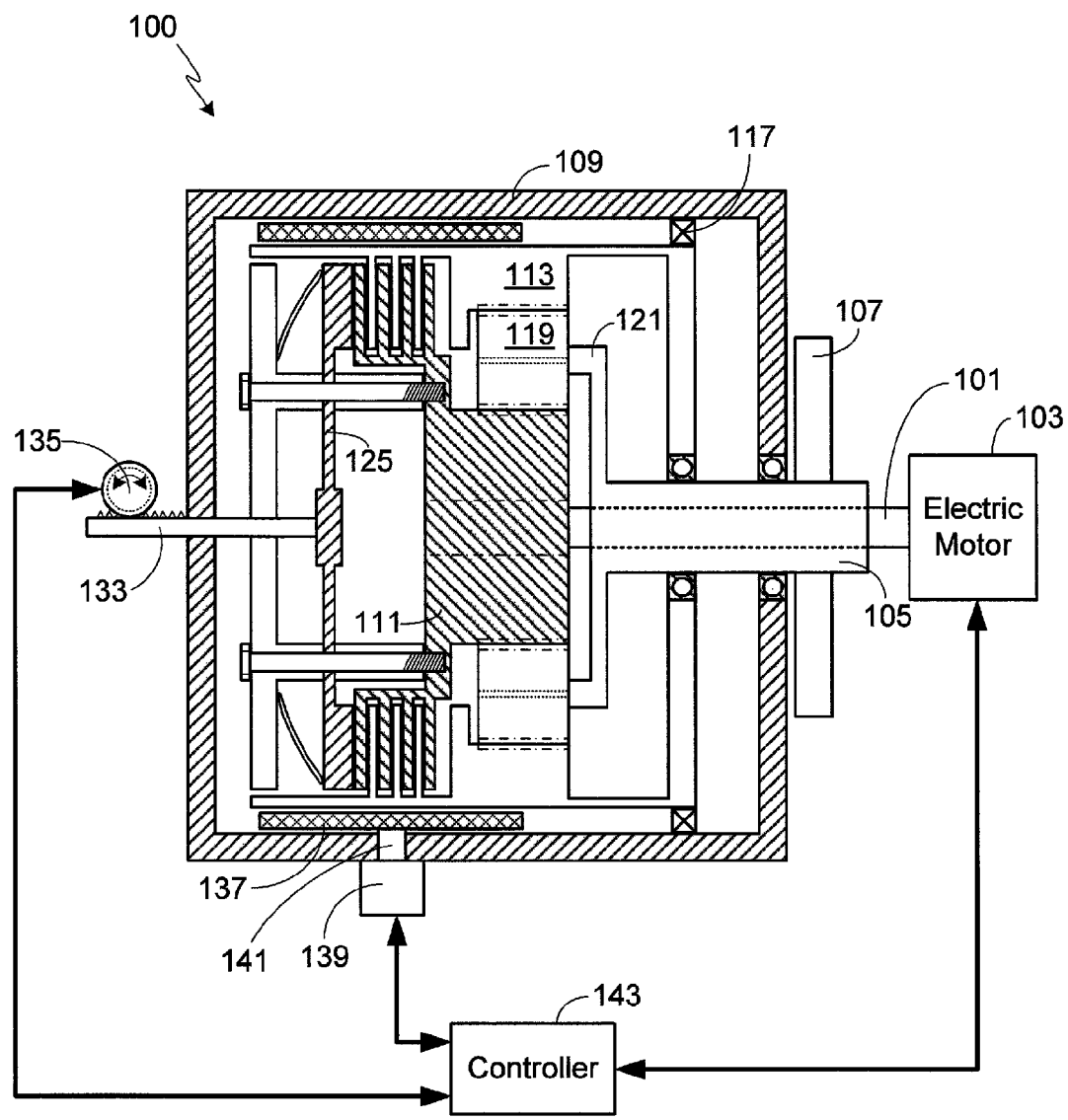
FIG. 5 provides a view of the dual ratio gearbox of FIGS. 1-4, configured to provide direct drive torque to the wheels of the vehicle.

In order to achieve forward vehicle motion with the gearbox in direct drive, controller 143 uses motor 135 to position actuator 133 and pressure plate 125 such that the clutch assembly is engaged as shown in FIG. 5. As a result, ring gear 113 is locked to sun gear 111 and the entire planetary gear assembly, i.e., gears 111, 113 and 119 will turn as a single unit. As long as ring gear 113 is rotating in the forward direction, sprag clutch assembly 117 permits motor 103 to apply either forward or reverse torque to input drive shaft 101.

During acceleration, shifting from under drive to direct drive using gearbox 100 is very smooth. As described above, when the gearbox is in the under drive mode and forward torque is being applied, sprag clutch assembly 117 prevents ring gear 113 from rotating. While shifting to direct drive using the multi-plate clutch assembly (e.g., pressure plate 125, discs 127, plates 129, compression spring 131, and pressure plate actuator 133), the sprag clutch 117 continues to insure that the input torque applied by motor 103 generates forward torque at the wheels. As the clutch assembly becomes engaged, a friction zone is created that shifts the gearbox smoothly towards the direct drive mode. The shift to direct drive is completed once ring gear 113 and sun gear 111 are synchronized.

When gearbox 100 downshifts from direct drive to under drive while the car is accelerating, controller 143 allows the multi-plate clutch assembly to slip while bringing motor 103 up to the necessary speed for the under drive gear ratio. Preferably controller 143 monitors both motor speed using sensor 601 and output drive shaft speed using sensor 603 (see FIG. 6), thus allowing controller 143 to quickly and efficiently increase the speed of motor 103 based on the under drive gear ratio and the current vehicle speed.

Figure 6:
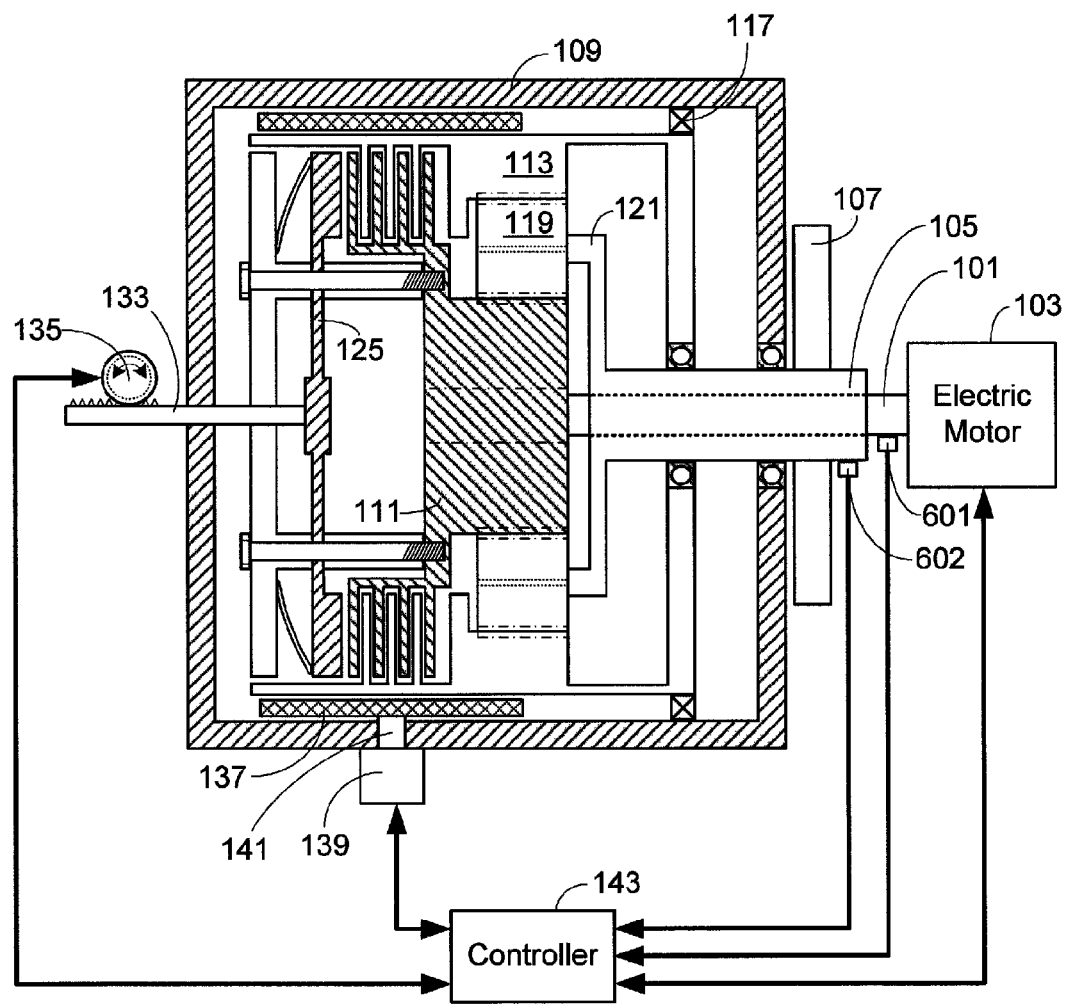
FIG. 6 provides a view of the dual ratio gearbox of FIGS. 1-5, with the inclusion of sensors to monitor input and output drive shaft speed.

While coasting, when gearbox 100 shifts from under drive to direct drive the change in rotational speed of motor 103 may lead to lurching or shuddering as the multi-plate clutch assembly becomes engaged, and before the ring gear 113 and sun gear 111 are synchronized. Drive train shuddering may be aggravated during this period if motor 103 undershoots the desired motor speed. Accordingly, in at least one preferred embodiment controller 143 monitors both motor speed and output drive shaft speed using sensors 601 and 603 as illustrated in FIG. 6. By monitoring both the motor speed and the output drive shaft speed, when the shift from under drive to direct drive is initiated, controller 143 is able to quickly and efficiently lower the speed of motor 103 to match that of the output drive shaft, thereby minimizing motor speed mismatch and preventing undershoot. Similarly, downshifting from direct drive to under drive requires controller 143 to quickly and efficiently increase the speed of motor 103 in order to minimize mismatch and the shuddering that can accompany such mismatch.

Figure 7:
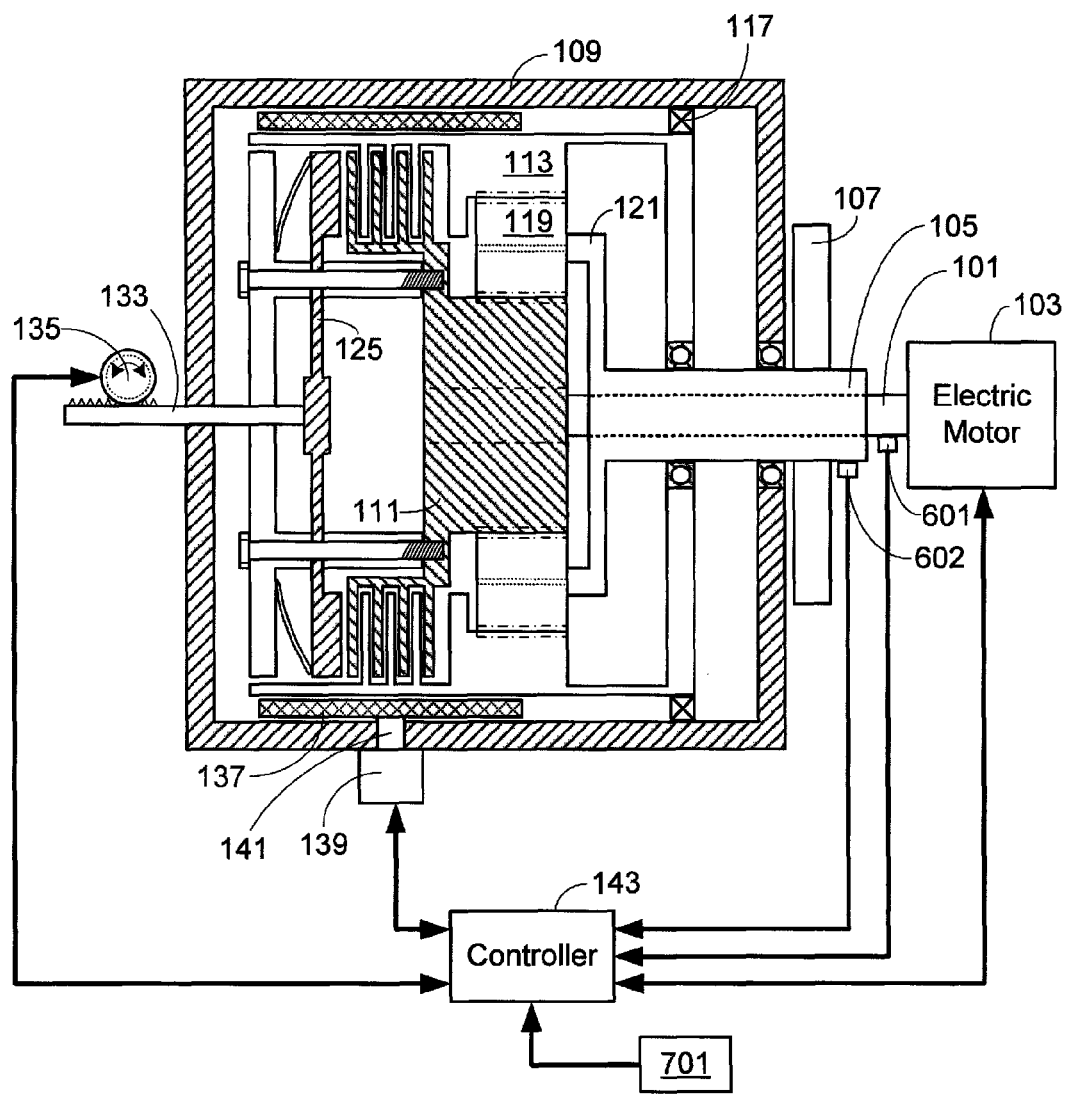
FIG. 7 provides a view of the dual ratio gearbox of FIG. 6, with the inclusion of a drive mode over-ride sensor.

In a typical configuration, shifting between under drive and direct drive is automatic and performed in accordance with a set of preprogrammed instructions that are either incorporated into controller 143 or input into a separate processor that is coupled to controller 143. Shifting is preferably based on motor speed, as monitored by sensor 601, although other characteristics such as vehicle speed may be used to determine when to shift between drive modes. Additionally in at least one embodiment of an automatic gearbox, and as illustrated in FIG. 7, the shift points between under drive and direct drive may be altered based on the input of switch 701. Switch 701 may monitor accelerator pedal movement, thus allowing the driver to alter shifting characteristics based on how rapidly and/or how far the accelerator pedal is depressed. Alternately, switch 701 may be a drive mode selector that allows the user to vary the drive mode, and thus the shifting characteristics, between multiple modes (e.g., sport, normal and efficiency).

Many drivers find it difficult to drive over hilly terrain. Such terrain is especially problematic when coupled with the stop and go traffic conditions associated with driving in the city. Under these conditions, accelerating away from a stop when the stop is on an uphill incline often leads to at least some backwards vehicle roll, which may make the driver nervous as well as potentially causing a minor collision if the vehicle rolls backwards and hits the car behind it. Accordingly, in one embodiment of the invention switch 701 is associated with a gearbox over-ride function. When selected, the gearbox remains in direct drive regardless of motor and/or vehicle speed. Although selecting this feature reduces acceleration from a dead stop, due to the locking effect of sprag clutch assembly 117, the car will not roll backwards when the brake is released, even when stopped on a steep incline. In an alternate embodiment, switch 701 monitors vehicle inclination and automatically switches the gearbox, via controller 143, to direct drive when the car is stopped on an uphill incline greater than a preset angle.

Figure 8:
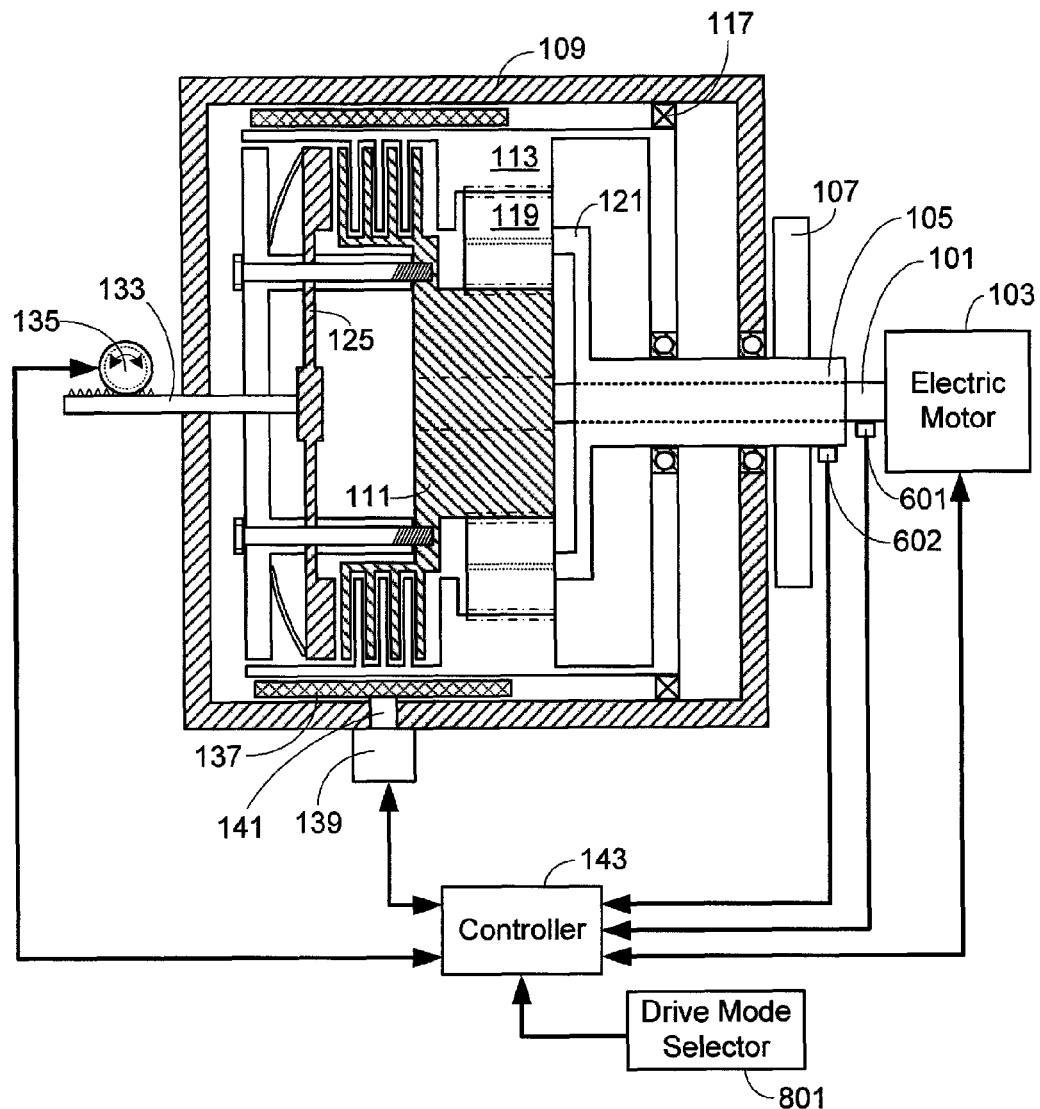
FIG. 8 provides a view of the dual ratio gearbox of FIG. 6 configured for manual drive selection.

In an alternate embodiment illustrated in FIG. 8, the dual ratio gearbox of the invention is configured to be used as a manual gearbox. In this configuration controller 143 is coupled to a drive mode selector 801, where the drive mode selector 801 determines when to shift between under drive and direct drive. Drive mode selector 801 may be designed to look like a typical gear shift selector; alternately, drive mode selector 801 may be comprised of a button, toggle or other switching means mounted on the dash, central console or steering wheel; alternately, drive mode selector 801 may be comprised of a button or lever mounted to the floor, thus allowing the driver to shift gears by depressing or otherwise engaging the floor mounted switch means.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A dual ratio constant mesh gearbox, comprising:
   a housing;
   an input drive shaft coupled to a vehicle propulsion electric motor;
   a sun gear rigidly coupled to said input drive shaft;
   a ring gear;
   a set of planetary gears interposed between said sun gear and said ring gear, wherein said set of planetary gears are in constant mesh with said sun gear and said ring gear;
   a planetary gear carrier coupled to said set of planetary gears and to an output drive shaft, wherein said output drive shaft is at least partially contained within said housing;
   a sprag clutch assembly contained within said housing, wherein said sprag clutch assembly permits rotation of said ring gear in a first direction within said housing and prevents rotation of said ring gear in a second direction within said housing;
   a second clutch assembly separate and independent of said sprag clutch assembly, wherein engaging said second clutch assembly locks said ring gear to said sun gear, and wherein disengaging said second clutch assembly unlocks said ring gear from said sun gear; and
   a band brake translatable from at least a first position to a second position, wherein said band brake in said first position permits rotation of said ring gear within said housing, and wherein said band brake in said second position prevents rotation of said ring gear within said housing.

2. The dual ratio constant mesh gearbox of claim 1, wherein said output drive shaft is hollow, wherein said input drive shaft passes through said output drive shaft, and wherein said input drive shaft is coaxial with said output drive shaft.

3. The dual ratio constant mesh gearbox of claim 2, said second clutch assembly comprising a multi-plate clutch assembly.

4. The dual ratio constant mesh gearbox of claim 2, said second clutch assembly further comprising a pressure plate actuator, wherein a position corresponding to said pressure plate actuator determines whether said second clutch assembly is engaged or disengaged.

5. The dual ratio constant mesh gearbox of claim 4, further comprising a positioning motor coupled to said pressure plate actuator, wherein said positioning motor controls said position of said pressure plate actuator.

6. The dual ratio constant mesh gearbox of claim 2, wherein said dual ratio constant mesh gearbox operates in a direct drive mode when said second clutch assembly is engaged and said ring gear is locked to said sun gear, wherein said sun gear and said set of planetary gears and said ring gear rotate within said housing as a single unit when said ring gear is locked to said sun gear, and wherein said input drive shaft is directly coupled to said output drive shaft causing said input and output drive shafts to rotate at the same rate when said ring gear is locked to said sun gear.

7. The dual ratio constant mesh gearbox of claim 2, wherein said dual ratio constant mesh gearbox operates in an under drive reverse mode when said second clutch assembly is disengaged and said band brake is in said second position, wherein reverse input torque applied by said vehicle propulsion electric motor to said input drive shaft when said dual ratio constant mesh gearbox is operating in said under drive reverse mode generates a reaction torque on said ring gear in said first direction, wherein rotation of said ring gear in said first direction is permitted by said sprag clutch and prevented by said band brake in said second position thereby causing reverse vehicle torque to be applied to at least one vehicle wheel by said planetary gear carrier and said output drive shaft.

8. The dual ratio constant mesh gearbox of claim 2, wherein said dual ratio constant mesh gearbox operates in an under drive mode when said second clutch assembly is disengaged and said ring gear is unlocked from said sun gear, wherein forward input torque applied by said vehicle propulsion electric motor to said input drive shaft generates a reaction torque on said ring gear in said second direction, wherein rotation of said ring gear in said second direction is prevented by said sprag clutch assembly causing forward vehicle torque to be applied to at least one vehicle wheel by said planetary gear carrier and said output drive shaft.

9. The dual ratio constant mesh gearbox of claim 2, further comprising:
    a controller coupled to said vehicle propulsion electric motor;
    a motor speed sensor coupled to said controller; and
    an output drive shaft speed sensor coupled to said controller, wherein upon an initiation of a downshift from a direct drive mode to an under drive mode said controller is configured to increase a motor speed corresponding to said vehicle propulsion electric motor based on a current output drive shaft speed and an under drive gear ratio.

10. The dual ratio constant mesh gearbox of claim 2, further comprising:
    a controller coupled to said vehicle propulsion electric motor;
    a motor speed sensor coupled to said controller; and
    an output drive shaft speed sensor coupled to said controller, wherein upon an initiation of an upshift from an under drive mode to a direct drive mode said controller is configured to decrease a motor speed corresponding to said vehicle propulsion electric motor based on a current output drive shaft speed.

11. The dual ratio constant mesh gearbox of claim 2, further comprising:
    a pressure plate actuator, wherein a position corresponding to said pressure plate actuator determines whether said second clutch assembly is engaged or disengaged;
    a positioning motor coupled to said pressure plate actuator, wherein said positioning motor controls said position of said pressure plate actuator;
    a controller coupled to said vehicle propulsion electric motor and to said positioning motor; and
    a motor speed sensor coupled to said controller, wherein said controller is configured to automatically upshift from an under drive mode to a direct drive mode and configured to automatically downshift from said direct drive mode to said under drive mode based on a current motor speed and a set of preprogrammed shift instructions, wherein said dual ratio constant mesh gearbox operates in said under drive mode when said second clutch assembly is disengaged and said ring gear is unlocked from said sun gear, and wherein said dual ratio constant mesh gearbox operates in a direct drive mode when said second clutch assembly is engaged and said ring gear is locked to said sun gear.

12. The dual ratio constant mesh gearbox of claim 11, further comprising a drive mode selector switch coupled to said controller, wherein said drive mode selector switch allows selection between a plurality of selectable drive modes, wherein corresponding to each of said plurality of selectable drive modes is one of a plurality of shift instruction subsets, and wherein said set of preprogrammed shift instructions is comprised of said plurality of shift instruction subsets.

13. The dual ratio constant mesh gearbox of claim 11, further comprising a drive mode over-ride switch coupled to said controller, wherein activation of said drive mode over-ride switch alters said set of preprogrammed shift instructions.

14. The dual ratio constant mesh gearbox of claim 13, wherein activation of said drive mode over-ride switch forces said dual ratio constant mesh gearbox to remain within said direct drive mode.

15. The dual ratio constant mesh gearbox of claim 11, further comprising:
    a second positioning motor coupled to said band brake and to said controller, wherein said second positioning motor controls whether said band brake is in said first position or said second position; and
    a reverse mode selector switch, wherein said reverse mode selector switch is configured to be user selectable, wherein said controller is configured to shift into a reverse drive mode when said reverse mode selector switch is selected, wherein said dual ratio constant mesh gearbox operates in said reverse drive mode when said second clutch assembly is disengaged and said band brake is in said second position.

16. The dual ratio constant mesh gearbox of claim 2, further comprising:
    a pressure plate actuator, wherein a position corresponding to said pressure plate actuator determines whether said second clutch assembly is engaged or disengaged;
    a positioning motor coupled to said pressure plate actuator, wherein said positioning motor controls said position of said pressure plate actuator;
    a controller coupled to said vehicle propulsion electric motor and to said positioning motor; and
    an output drive shaft speed sensor coupled to said controller, wherein said controller is configured to automatically upshift from an under drive mode to a direct drive mode and configured to automatically downshift from said direct drive mode to said under drive mode based on a current output drive shaft speed and a set of preprogrammed shift instructions, wherein said dual ratio constant mesh gearbox operates in said under drive mode when said second clutch assembly is disengaged and said ring gear is unlocked from said sun gear, and wherein said dual ratio constant mesh gearbox operates in a direct drive mode when said second clutch assembly is engaged and said ring gear is locked to said sun gear.

17. The dual ratio constant mesh gearbox of claim 16, further comprising a drive mode selector switch coupled to said controller, wherein said drive mode selector switch allows selection between a plurality of selectable drive modes, wherein corresponding to each of said plurality of selectable drive modes is one of a plurality of shift instruction subsets, and wherein said set of preprogrammed shift instructions is comprised of said plurality of shift instruction subsets.

18. The dual ratio constant mesh gearbox of claim 16, further comprising a drive mode over-ride switch coupled to said controller, wherein activation of said drive mode over-ride switch alters said set of preprogrammed shift instructions.

19. The dual ratio constant mesh gearbox of claim 18, wherein activation of said drive mode over-ride switch forces said dual ratio constant mesh gearbox to remain within said direct drive mode.

20. The dual ratio constant mesh gearbox of claim 2, further comprising:
   a pressure plate actuator, wherein a position corresponding to said pressure plate actuator determines whether said second clutch assembly is engaged or disengaged;
   a positioning motor coupled to said pressure plate actuator, wherein said positioning motor controls said position of said pressure plate actuator;
   a controller coupled to said vehicle propulsion electric motor and to said positioning motor;
   an under drive mode selector switch, wherein said under drive mode selector switch is configured to be user selectable; and
   a direct drive mode selector switch, wherein said direct drive mode selector switch is configured to be user selectable, wherein said controller is configured to shift into an under drive mode when said under drive mode selector switch is selected, wherein said controller is configured to shift into a direct drive mode when said direct drive mode selector switch is selected, wherein said dual ratio constant mesh gearbox operates in said under drive mode when said second clutch assembly is disengaged and said ring gear is unlocked from said sun gear, and wherein said dual ratio constant mesh gearbox operates in a direct drive mode when said second clutch assembly is engaged and said ring gear is locked to said sun gear.

21. The dual ratio constant mesh gearbox of claim 20, further comprising:
   a second positioning motor coupled to said band brake and to said controller, wherein said second positioning motor controls whether said band brake is in said first position or said second position; and
   a reverse mode selector switch, wherein said reverse mode selector switch is configured to be user selectable, wherein said controller is configured to shift into a reverse drive mode when said reverse mode selector switch is selected, wherein said dual ratio constant mesh gearbox operates in said reverse drive mode when said second clutch assembly is disengaged and said band brake is in said second position.

* * * * *